United States Patent [19]

Clausen

[11] 4,047,067
[45] Sept. 6, 1977

[54] SODIUM HALIDE DISCHARGE LAMP WITH AN ALUMINA SILICATE BARRIER ZONE IN FUSED SILICA ENVELOPE

[75] Inventor: Edward M. Clausen, Eastlake, Ohio

[73] Assignee: General Electric Company, Schenectady, N.Y.

[21] Appl. No.: 476,726

[22] Filed: June 5, 1974

[51] Int. Cl.$^2$ .............................................. H01J 61/35
[52] U.S. Cl. .................................................. 313/221
[58] Field of Search ............................... 313/221, 112

[56] References Cited

U.S. PATENT DOCUMENTS

| 2,568,459 | 9/1951 | Noel | 313/221 X |
| 3,259,777 | 7/1966 | Fridrich | 313/184 |
| 3,350,598 | 10/1967 | Corbin et al. | 313/221 X |
| 3,845,343 | 10/1974 | Hammer | 313/221 |

FOREIGN PATENT DOCUMENTS

| 884,498 | 10/1971 | Canada | 313/221 |
| 1,034,122 | 6/1966 | United Kingdom | 313/221 |
| 741,556 | 12/1955 | United Kingdom | 313/221 |

Primary Examiner—Palmer C. Demeo
Attorney, Agent, or Firm—Ernest W. Legree; Lawrence R. Kempton; Frank L. Neuhauser

[57] ABSTRACT

A graded alumina silicate glass layer or zone is formed at the surface of fused silica by first applying a polycrystalline coating of aluminum oxide to the silica and then fusing the coating into the silica at a high temperature. Such a zone on the outside of the fused silica arc tube of a metal halide lamp containing sodium is particularly effective to inhibit sodium loss by diffusion through the tube walls.

1 Claim, 3 Drawing Figures

SODIUM HALIDE DISCHARGE LAMP WITH AN ALUMINA SILICATE BARRIER ZONE IN FUSED SILICA ENVELOPE

BACKGROUND OF THE INVENTION

The invention relates to a graded layer or zone at the surface of fused silica for reducing its sodium ion conductivity, and to a method of treating fused silica to produce such zone. The invention is particularly useful to slow down sodium ion diffusion through the arc tube walls of sodium containing metal halide lamps, and is also useful in other applications where sodium diffusion is undesirable.

Metal halide lamps generally contain a filling of mercury and light-emitting metals including sodium in the form of halides, commonly the iodide, in fused silica envelopes. The mobility of the sodium ion is such that the fused silica or quartz is relatively porous to it, and during lamp operation, sodium will pass from the hot arc plasma through the fused silica wall to the cooler region between the arc tube and the outer jacket or envelope of the lamp and condense on the outer envelope and parts. The lost sodium is unavailable to the discharge and can no longer contribute its characteristic emission so that the light output gradually diminishes and the color shifts from white towards blue. The arc becomes more constricted and, in a horizontally operating lamp particularly, may bow against the arc tube wall and soften it. Also loss of sodium causes the operating voltage of the lamp to increase and it may rise to the point where the arc can no longer be sustained by the ballast. At this point the life of the lamp is ended.

In the past, several different types of coatings on fused silica have been tried to reduce sodium ion diffusion through the envelope wall of metal halide lamps. One barrier proposed comprised a layer of zirconium oxide upon the inner surface of the arc tube to inhibit sodium diffusion and a second layer of a refractory oxide such as calcium, magnesium or aluminum oxide to protect the zirconium oxide layer from the attack of the arc stream. Such coatings are difficult to apply and have not found acceptance.

Sputtered alumina coatings have been tried but have been generally unsuccessful, probably because the coatings were either too thin to be effective or else too thick to remain continuous and adherent. The large difference in thermal expansion between fused silica and metal oxide coatings causes thick coatings to eventually tear apart under thermal cycling.

The object of the invention is to provide an improved barrier for reducing sodium ion conductivity and the rate of sodium ion diffusion in fused silica, and a novel method for forming such barrier.

SUMMARY OF THE INVENTION

In accordance with my invention, I provide a graded glassy alumina silicate layer or zone at the outside surface of fused silica tubes serving as envelopes for metal halide lamps containing sodium. I have found that it is extremely important that the zone be on the outside of the envelope. The outside is the low temperature side of the container and there may be a temperature difference of 50° C or more between inside and outside surfaces. The rate of diffusion of sodium ions through fused silica is an exponential function of temperature. This means that, depending on temperature, a difference of 50° C may entail a ratio from 2 to 1 up to 5 to 1 in the diffusion rates.

According to my invention, I first coat fused silica with aluminum oxide by any one of several different methods, for instance by spraying an aluminum chloride solution onto the silica surface which has been preheated to approximately 800° C. The aluminum chloride is converted to aluminum oxide which adheres very tenaciously to the surface. Thereafter the silica tube is surface-heated, for instance by an oxyhydrogen torch or by a radio frequency plasma torch, to a temperature sufficient to fuse the alumina into the silica surface. By this means I have obtained graded alumina silicate layers or zones which were between 5 and 25 microns thick with peak concentrations ranging from 5 to 25 weight percent aluminum oxide in fused silica. Depending on the thickness of the coating and the aluminum oxide concentration, the sodium ion conductivity will be at least one order of magnitude lower than in uncoated silica and may be over two orders of magnitude lower.

DETAILED DESCRIPTION

The first step in forming an alumina silicate barrier zone is to apply an alumina coating to the fused silica. I have done so by two different methods. The first consists in spraying a saturated solution of an aluminum salt which decomposes under heat to form the oxide onto the surface of a silica tube which has been suitably preheated. I have used aluminum chloride and aluminum nitrate with the tube preheated to about 800° C. At the hot silica surface, the salts decompose and react with oxygen and/or water to form aluminum oxide which adheres very tenaciously to the surface. Other aluminum salts which decompose at a low enough temperature can be used. When the salt solutions are sprayed onto the hot silica surface, the resultant coatings are quite grainy which causes the surface of the silica to have a slight undulatory appearance after fusion. However I have found that the addition of alcohols to the solution, in particular isopropyl alcohol, reduces the surface tension of the liquid resulting in smoother coatings and smoother surfaces after fusing.

The second method which I have used for applying alumina is to burn aluminum isopropoxide in oxygen and pass the silica tube through the smoke emanating from the flame or combustion. Coatings applied by this technique are very uniform; however, they are not as adherent as those applied by the first method and could easily be wiped from the surface. Also, I have found that with this method there is a maximum coating thickness which can be attained. The alumina particles emanating from the flame appear to have a high surface charge which, once a certain coating thickness is reached, causes a repelling action which prevents further particle laydown.

To fuse the white opaque coating of aluminum oxide and cause it to diffuse into the silica and form the barrier zone, four different techniques have been used. The simplest from the point of view of equipment is an oxyhydrogen torch, but in some instances it was difficult to fuse the alumina into the silica surface because of the upper temperature limit with this type of heating. An additional problem is that hydroxyls or water which are present in the flame could be incorporated into the zone with a deleterious effect on the barrier properties. The most successful methods for fusing the alumina coating have been the use of either a dc plasma torch or an rf plasma torch. With either of these techniques there is no temperature limitation. It is also possible to use a $CO_2$ laser.

Figure 1:
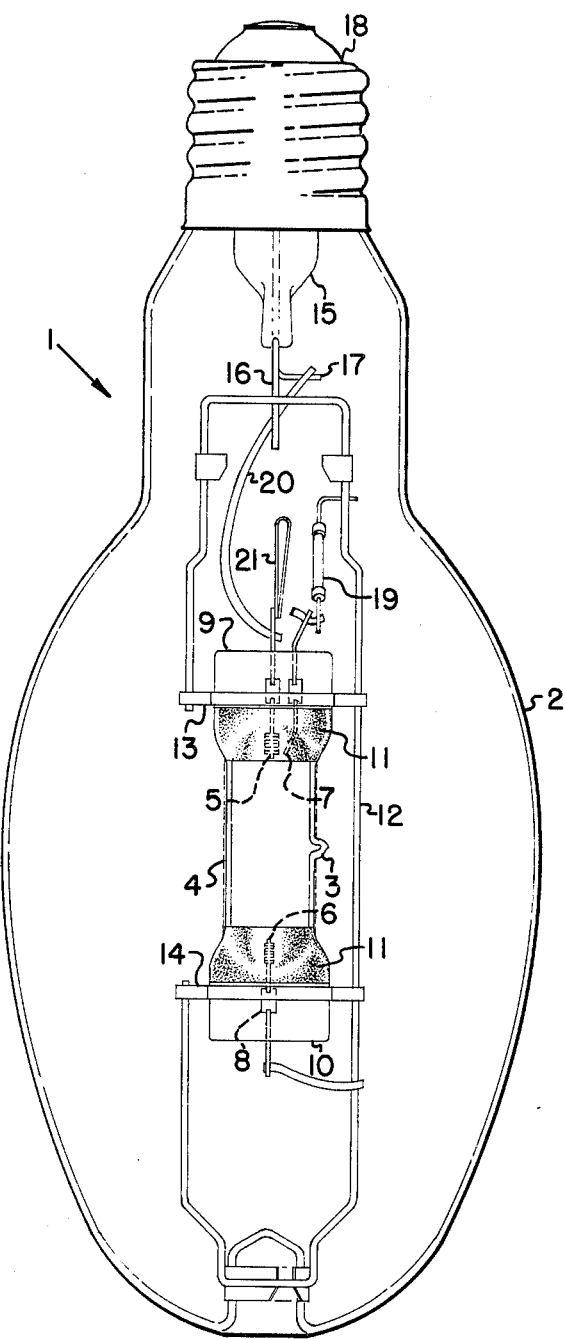
FIG. 1 shows a metal halide lamp comprising a fused silica arc tube embodying the invention.

Referring to FIG. 1 of the drawings, a metal halide vapor arc lamp 1 embodying the invention comprises an outer glass envelope 2 and a fused silica inner arc tube 3 having an alumina silicate coating on its outer surface, represented by dotted line 4. The arc tube contains a quantity of mercury which is substantially completely vaporized and exerts a partial pressure in the range of 1 to 15 atmospheres during operation. In addition it contains sodium iodide in excess of the quantity vaporized at the operating temperature and other suitable metal halides, for instance smaller amounts of thallium iodide and indium iodide or scandium iodide and thorium iodide. An inert rare gas at a low pressure, for instance argon at 25 torr, is included in the arc tube to facilitate starting and warm up.

A pair of main arcing electrodes, 5 at the upper or base end and 6 at the dome end, plus an auxiliary starting electrode 7 at the bae end adjacent main electrode 5 are sealed into the ends of the arc tube. The electrodes are supported on inleads which include intermediate thin molybdenum foil sections 8 hermetically sealed through the flattened ends 9, 10 of the arc tube, commonly referred to as full diameter pinch seals. The main electrodes 5, 6 each comprise a tungsten wire helix wrapped around a core wire and may include activating material such as thorium oxide filling the interstices between turns. An opaque heatreflecting coating 11 about the tube ends, is indicated by speckling.

The arc tube is supported within the outer envelope by a mount or wire frame 12 and metal straps 13, 14 encompassing the pinch seals 9, 10. The neck of the outer envelope is closed by a re-entrant stem 15 through which extend stiff inlead wires 16, 17 connected at their outer ends to the usual screw base 18. The wire frame 12 provides circuit continuity from inlead 16 to main electrode 6 and also through starting resistor 19 to auxiliary electrode 7. A metal ribbon 20 connects main electrode 5 to inlead wire 17 and a bimetal switch 21 short-circuits auxiliary electrode 7 to main electrode 5 after the lamp has warmed up.

The alumina silicate zone or graded layer 4 on the outside of arc tube 3 may be formed while the fused silica is in the state of open ended tubing before it has been processed into a lamp envelope. Each of the previously described methods for applying the alumina coating has advantages and disadvantages. Spraying a solution of heat-decomposable aluminum salt onto the hot silica is fast but has the disadvantage that noxious gas byproducts, for instance HCl or $HNO_3$, must be disposed of. Coatings applied by the iospropoxide method are very uniform, and after they are fused into the surface, the tubing is indistinguishable from plain untreated tubing. There are no noxious byproducts but the rate of coating is very slow and the process efficiency is low.

Figure 2:
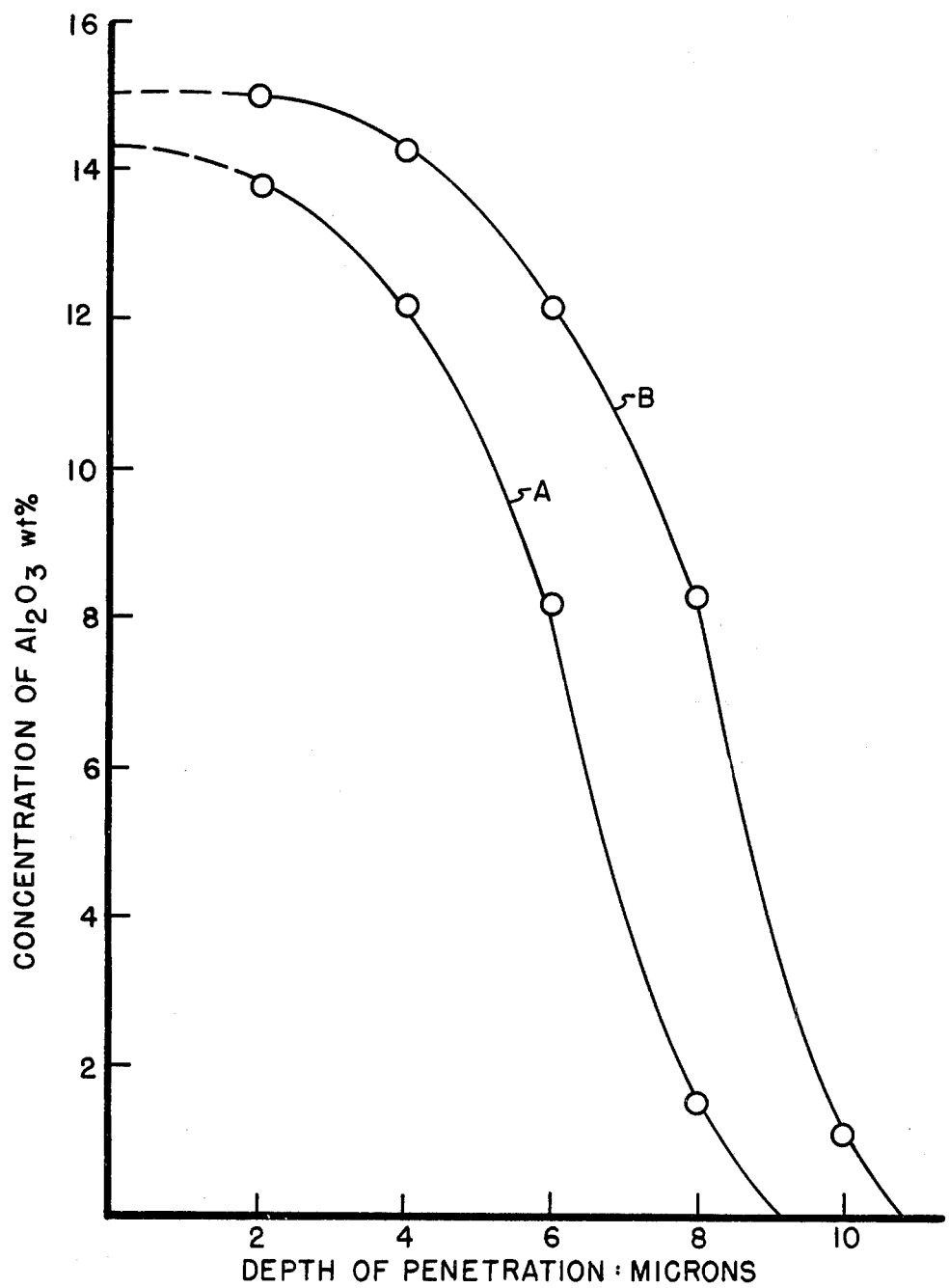
FIG. 2 is a graph showing the concentration of alumina as a function of depth of penetration in fused silica.
Figure 3:
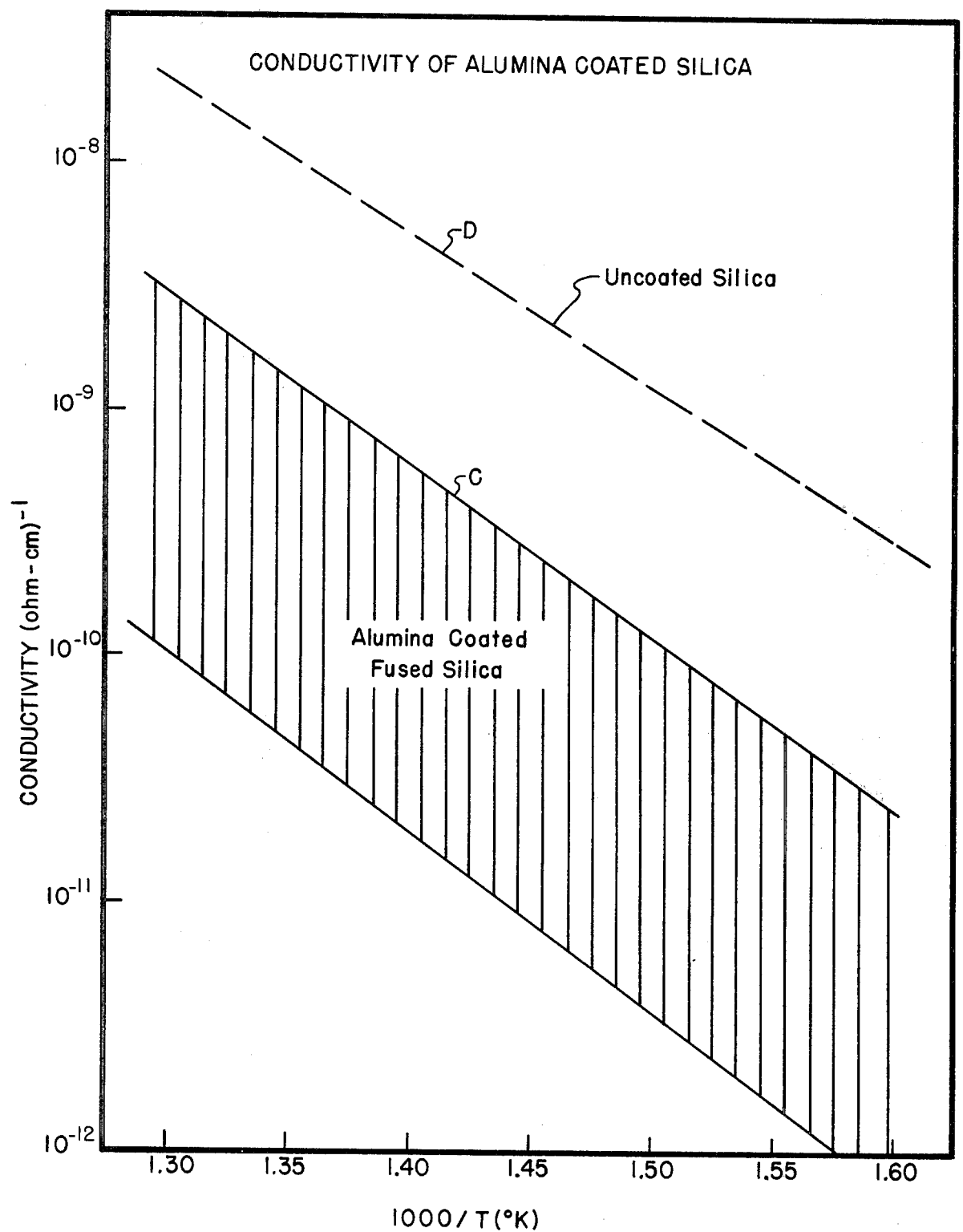
FIG. 3 is a chart giving the sodium ion conductivity of fused silica having an alumina silicate surface zone and comparing it with untreated silica over a range of temperature.

I have measured the sodium ion conductivity of fused silica tubing coated and fused by each of the foregoing methods, and I have analyzed the zone thickness and aluminum concentration by means of an electron beam microprobe. In FIG. 2, curves A and B show the concentration of $Al_2O_3$ in weight percent against depth of penetration measured in microns for two different samples of fused silica. In FIG. 3, the vertically hatched band C shows the range in conductivity of alumina zoned fused silica as a function of the reciprocal of absolute temperature measured in degrees Kelvin. The broken line D above represents the conductivity of untreated silica. It can be seen that the alumina zone reduces the sodium ion transport at least one order of magnitude and can reduce it up to $2\frac{1}{2}$ orders of magnitude.

The variations in conductivity appear to be related primarily to the method of application and fusion, or to sodium contamination in the salts used in processing. Coatings applied by the isopropoxide method and later fused with a plasma torch have the lowest sodium ion conductivity. The major difference between this coating and fusing technique and the others is that the whole process is relatively dry and water free. With each of the other methods, there are occasions when water can be incorporated into the coatings and this may reduce the effectiveness of the barrier layer. It is possible that the incorporation of hydroxyls into the coating and zone may reduce its effectiveness as a barrier to sodium transport.

In accordance with my invention, I have formed barrier layers or zones of alumina silicate in fused silica up to 25 microns thick with peak concentrations ranging from 5 to 25 weight percent aluminum oxide. Barrier layers wherein the alumina concentration exceeded 25 weight percent tended to crack or spall off and were unsatisfactory. The concentration of alumina is graded and varies from a maximum at the surface to zero at maximum depth, so that the barrier may be referred to as a zone. Barrier layers within the 5 to 25 microns thickness range have been tested and found to reduce the rate of sodium ion transport through fused silica from approximately 1 to $2\frac{1}{2}$ orders of magnitude, that is in a ratio from approximately 10 to 500. Accelerated lamp experiments wherein the coatings were applied to the outside of fused silica arc tubes of metal halide lamps containing sodium as illustrated in FIG. 1, have shown a substantial reduction in the rate of sodium loss.

When the coating of polycrystalline aluminum oxide is fused into the silica surface, I believe it forms a zone or layer of alumina silicate glass which acts as a barrier. The mechanism by which the alumina silicate acts as a barrier may be a stuffing of the silica structure by aluminum atoms which increase the density of the silica and reduce the mobility of the sodium ions.

What I claim as new and desire to secure as Letters Patent of the United States is:

1. A metal halide lamp comprising a fused silica envelope containing a fill including sodium halide, said envelope having on the outside an alumina silicate glass zone at the surface serving as a barrier to sodium diffusion, said zone comprising aluminum oxide heat-diffused into the fused silica, said zone being from 5 to 25 microns thick and the peak concentration of aluminum oxide in it ranging from 5 to 25 weight percent.

* * * * *